United States Patent

[11] 3,619,082

| [72] | Inventor | George B. Meginnis<br>Indianapolis, Ind. |
|---|---|---|
| [21] | Appl. No. | 742,900 |
| [22] | Filed | July 5, 1968 |
| [45] | Patented | Nov. 9, 1971 |
| [73] | Assignee | General Motors Corporation<br>Detroit, Mich. |

[54] TURBINE BLADE
16 Claims, 16 Drawing Figs.

[52] U.S. Cl. .................................................. 416/90,
416/97, 416/231
[51] Int. Cl. ..................................................... F01d 5/08,
F01d 5/18
[50] Field of Search........................................... 416/229,
231, 232, 90, 91, 96, 97; 29/156.8 H, 183

[56] References Cited
UNITED STATES PATENTS

| 2,851,216 | 9/1958 | Scanlan et al. ............... | 416/90 |
| 2,879,028 | 3/1959 | Stalker .......................... | 416/90 |
| 3,457,619 | 7/1969 | Kydd ............................. | 29/156.8 |
| 3,067,982 | 12/1962 | Wheeler, Jr. ................. | 29/156.8 H |

Primary Examiner—Samuel Feinberg
Attorneys—Paul Fitzpatrick and E. W. Christen

ABSTRACT: A turbine rotor blade of laminated porous metal cast into a base includes an inner reinforcing layer which has increasing porosity in the direction spanwise of the blades so that the strength diminishes with load in the spanwise direction and the porosity provides for flow of air to the porous blade wall. Pores or relieved areas in some sections of some layers are elongate and disposed with their long dimension spanwise of the blade for increased strength in this direction, in which stress in the blade is greatest.

PATENTED NOV 9 1971

INVENTOR.
George B. Meginnis
BY
Paul Fitzpatrick
ATTORNEY

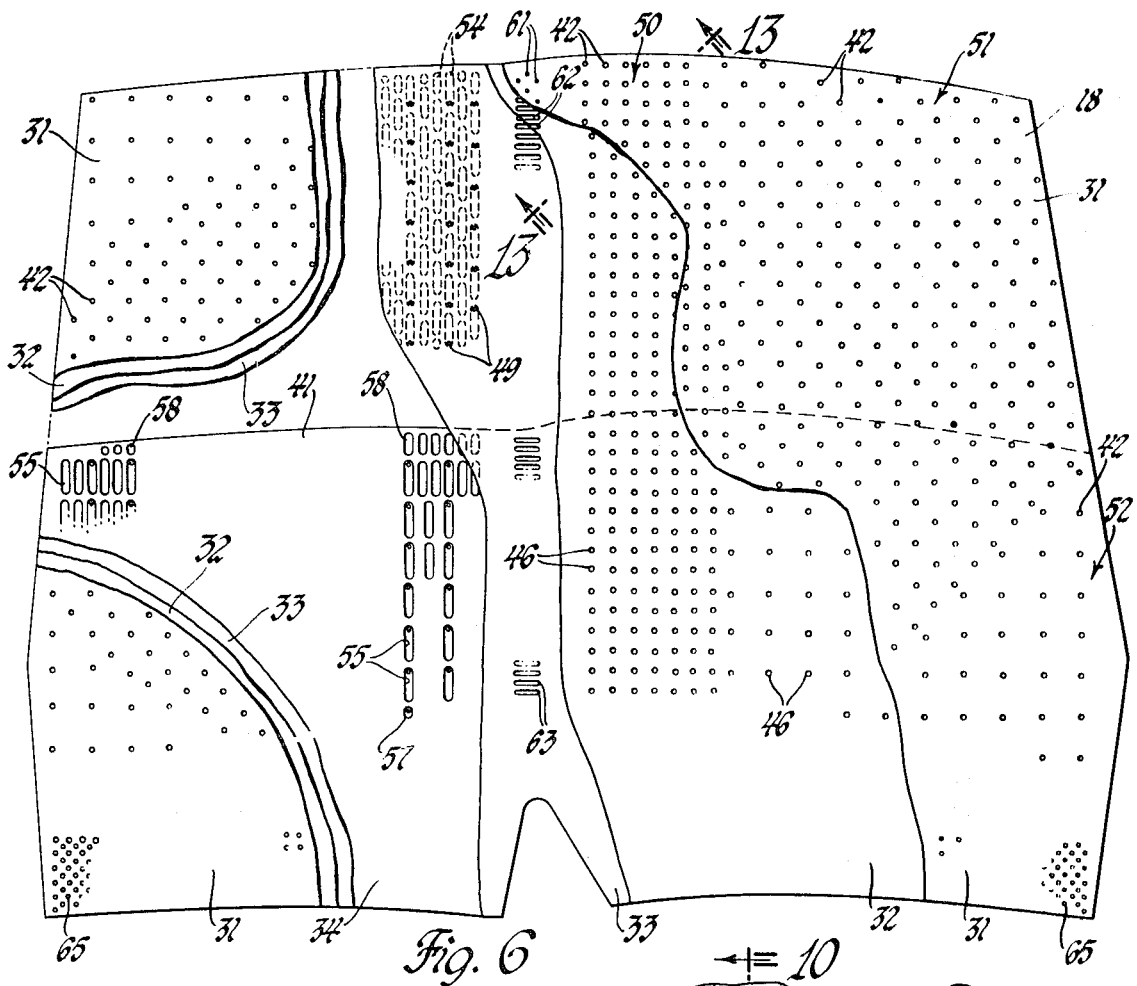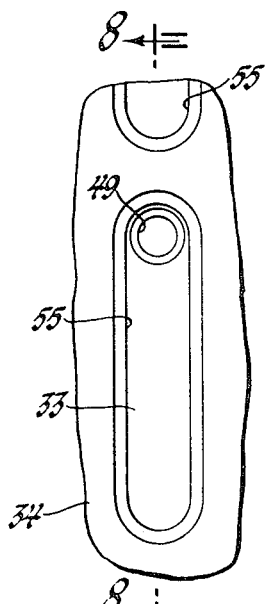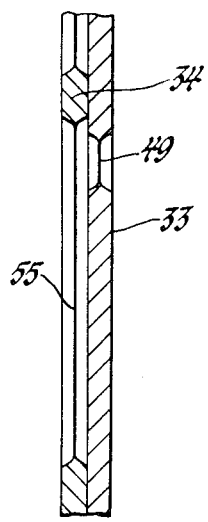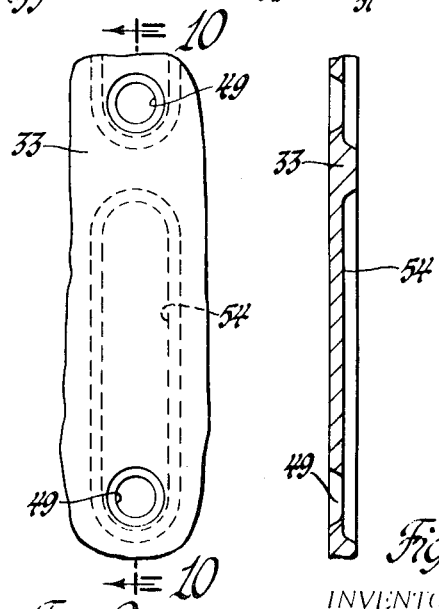

INVENTOR.
George B. Meginnis
BY
Paul Fitzpatrick
ATTORNEY

PATENTED NOV 9 1971 3,619,082

INVENTOR
George B. Meginnis
BY
Paul Fitzpatrick
ATTORNEY

TURBINE BLADE

The invention herein described was made in the course of work under a contract or subcontract thereunder with the Department of Defense.

My invention is directed to improvements in fluid-directing devices such as turbine blades, particularly turbine blades of porous material adapted to be cooled by transpiration of a cooling medium such as compressed air, for example, through the walls of the blade to the exterior surface thereof. The invention is particularly directed to a structure which strengthens the blade and is better adapted to resist centrifugal and gas-dynamic forces on the blade while preserving the ability of the blade to flow air for cooling and while minimizing weight of the blade.

Briefly, in the preferred embodiment, a blade according to my invention involves three principal structural features: First, pores or depressions in the porous material which are elongate and are oriented with their greater dimension spanwise of the blade so that strength of the material is greatest in the spanwise direction to better resist centrifugal force and bending loads, while minimizing weight. Second, the addition of a reinforcing layer to the interior of a hollow porous blade with the reinforcing layer bonded to the interior surface of the blade and fixed to the blade base or root. The reinforcing layer is porous so as to conduit air to the porous blade structure. Third, it involves a tapered structure, preferably in the sense that the porosity of the reinforcing layer increases in the direction away from the base so that the strength increases in the direction towards the base. Preferably, the porosity is due to the presence of radially extending rows of holes or grooves in the reinforcing layer and the number of rows of holes or grooves increases with the distance from the blade base. Alternatively, one or more layers of the blade wall may taper in thickness spanwise of the blade.

These three features may be used separately in appropriate environments, but the preferred embodiment of my invention incorporates all three in a blade of exceptional utility. The invention is particularly suited to laminated porous metal structures in which the laminae are etched or otherwise machined to provide the pores, but may be applicable to other porous structures.

The principal objects of my invention are to provide an improved blade structure for high-temperature turbomachines, to provide blade structure having greater resistance to centrifugal and gas-dynamic forces, to provide such a blade that is feasible to manufacture, to provide a highly suitable reinforcing structure for a porous metal transpiration-cooled blade structure, and to improve the utility of laminated porous metal blades subject to high temperature and high stresses.

The nature of my invention and the advantages thereof will be apparent to those skilled in the art from the succeeding detailed description of the preferred embodiment of the invention and the accompanying drawings thereof.

FIG. 6 is a developed view of the blade wall structure, with layers broken away.

FIG. 7 is a greatly enlarged fragmentary elevation view of the two innermost layers as seen from the interior of the blade near the base.

FIG. 8 is a fragmentary sectional view of the same taken on a plane extending spanwise of the blade as indicated by the line 8—8 in FIG. 7.

FIG. 9 is a greatly enlarged fragmentary elevation view of the inner layer of the blade near the tip as viewed from its outer face.

FIG. 10 is a fragmentary sectional view of the same taken on a spanwise-extending plane as indicated by the line 10—10 in FIG. 9.

It may be noted that my blade is a structure relating to and incorporating features of turbine blade and vane structures described and claimed in the following United States patent applications, of common ownership with this application: Ser. No. 526,207 of Bratkovich and Meginnis for Laminated Porous Metal, filed Feb. 9, 1966; Ser. No. 691,834 of Emmerson for Turbine Cooling, filed Dec. 19, 1967; and Ser. No. 707,556 of Helms for Turbine Blade, filed Feb. 23, 1968.

Figure 1:
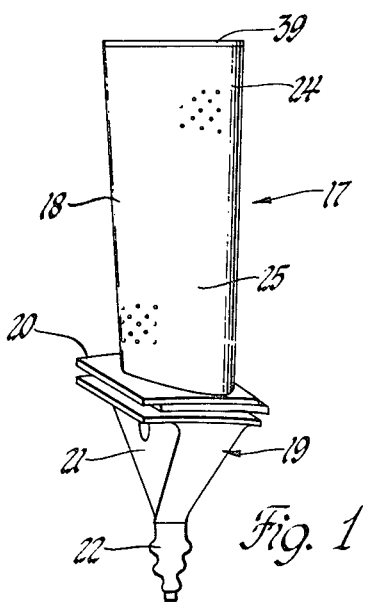
FIG. 1 is an elevation view of a turbine rotor blade taken on a plane transverse to the axis of rotation of the blade.
Figure 2:
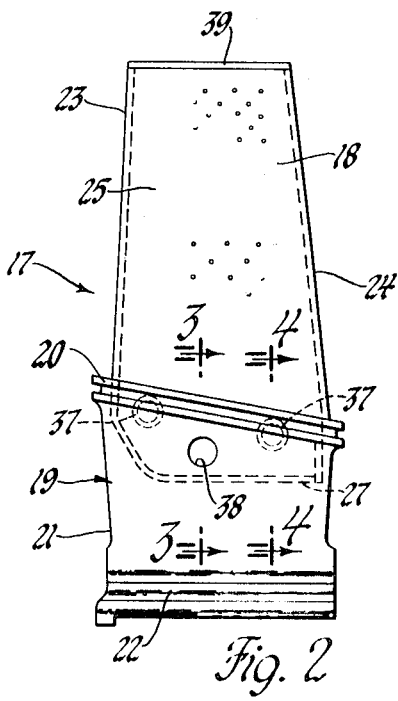
FIG. 2 is an elevation view taken on a plane parallel to the axis of rotation.
Figure 3:
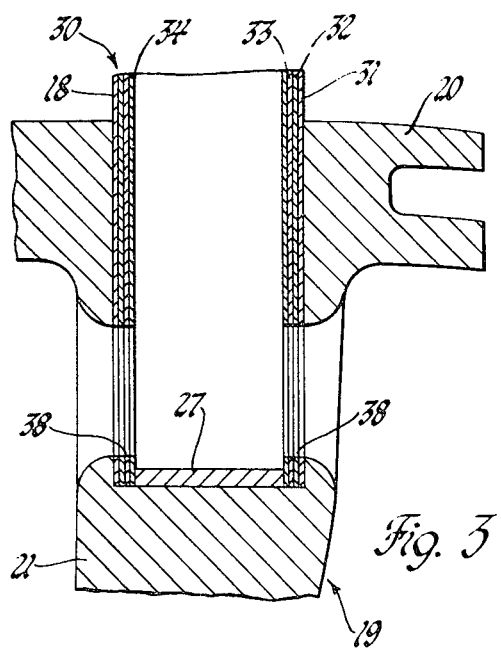
FIG. 3 is a fragmentary enlarged sectional view of the base portion of the blade taken on the plane indicated by the line 3—3 in FIG. 2.
Figure 4:
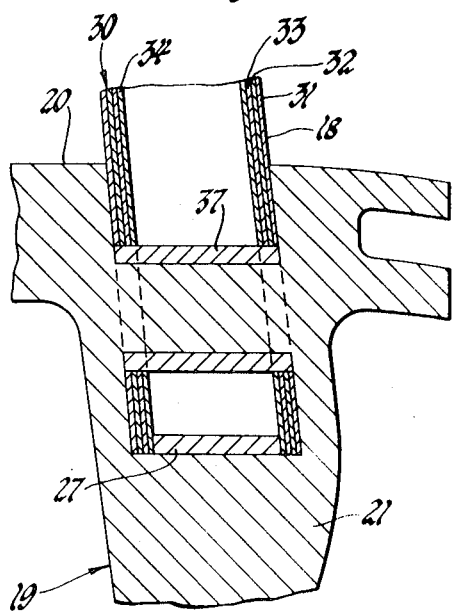
FIG. 4 is a fragmentary enlarged sectional view of the base portion of the blade taken on the plane indicated by the line 4—4 in FIG. 3.
Figure 5:
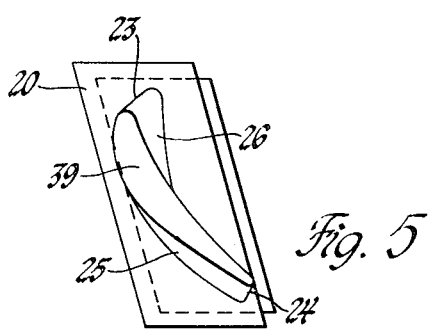
FIG. 5 is a plan view of the blade.

FIGS. 1, 2, and 5 show the general configuration of a turbine rotor blade assembly which, except as will be pointed out later, is essentially the same as that described in the Helms application referred to above. The blade assembly 17, which is of conventional overall form, includes a blade 18 extending from and fixed to a base member, foot, or attaching portion 19. The blade 18 is of twisted airfoil configuration, and may be of any shape suited to the particular installation. The base is an integral casting which consists of three main portions; a platform 20, a stalk 21, and a root 22, the root being of multiple dovetail configuration adapted to be retained in suitable slots in a turbine rotor. The blade has a radiused leading edge 23, a trailing edge 24, a convex wall 25, and a concave wall 26. The walls are spaced apart to provide a hollow blade, and both extend from the leading edge to the trailing edge. Referring to FIGS. 2, 3, and 4, the blade extends into the base member or foot 19, and specifically into the upper portion of the stalk 21, which it terminates in a plate or plug 27 which closes the lower end of the blade. As shown clearly in FIGS. 3 and 4, the blade 18 is made up of four layers or laminae. An outer wall or blade wall 30 is composed of three layers; an outer layer 31, a middle layer 32, and an inner layer 33. The fourth layer is an inner wall or reinforcing layer 34 which lies against the inner layer 33. These four laminae are all suitably fixed together, preferably by diffusion bonding before the blade blank is formed into the blade airfoil illustrated. The plug 27 is welded to the inner end of the blade.

Two tubes 37 (FIGS. 2 and 4) extend from face to face of the blade and are welded to the walls. When the blade base is cast around the blade, the metal of the base extends into and fills the tubes 37, thus locking the blade to the base. Holes 38 (FIGS. 2 and 3) machined through the stalk and the walls of the blade admit cooling air to the interior of the blade. A cap 39 of porous laminated metal welded in place closes the outer end of the blade.

Considering now in detail the structure of the blade or airfoil portion of the assembly, this is made up of two principal elements; a blade wall or outer wall 30 and an inner wall or reinforcing layer 34. The outer wall 30 is made up of three layers; the outer layer 31, the middle layer 32, and the inner layer 33. Preferably, the inner wall 34 extends approximately halfway from the base to the tip of the blade, terminating at an outer edge 41. Except for this, the four layers have a common outline extending from the inner to the outer end of the blade, and from the trailing edge across one face of the blade, around the leading edge, and across the other face of the blade to the trailing edge. The outer wall is porous, as in the blade and vane structures described in the applications referred to above.

The inner wall also is porous, since this must allow air to flow to the outer wall. All three layers 31, 32, and 33 of the outer wall are provided with holes or pores which extend through then and which are located so that the pores in adjacent sheets are out of register with each other so that the air for cooling must flow parallel to the face of the blade, as well as through the metal of the layers, from the inner surface to the outer surface. The two outer layers 31 and 32 are provided with bosses on their inner surfaces which engage the layer next inside them so as to provide a space between these layers for lateral movement of the cooling air. The distribution and size of the holes and of the lateral conducting passages may be such as to vary the cooling effect over different areas of the blade in accordance with the amount of heat delivered to such areas of the blade by the motive fluid.

Figure 11:
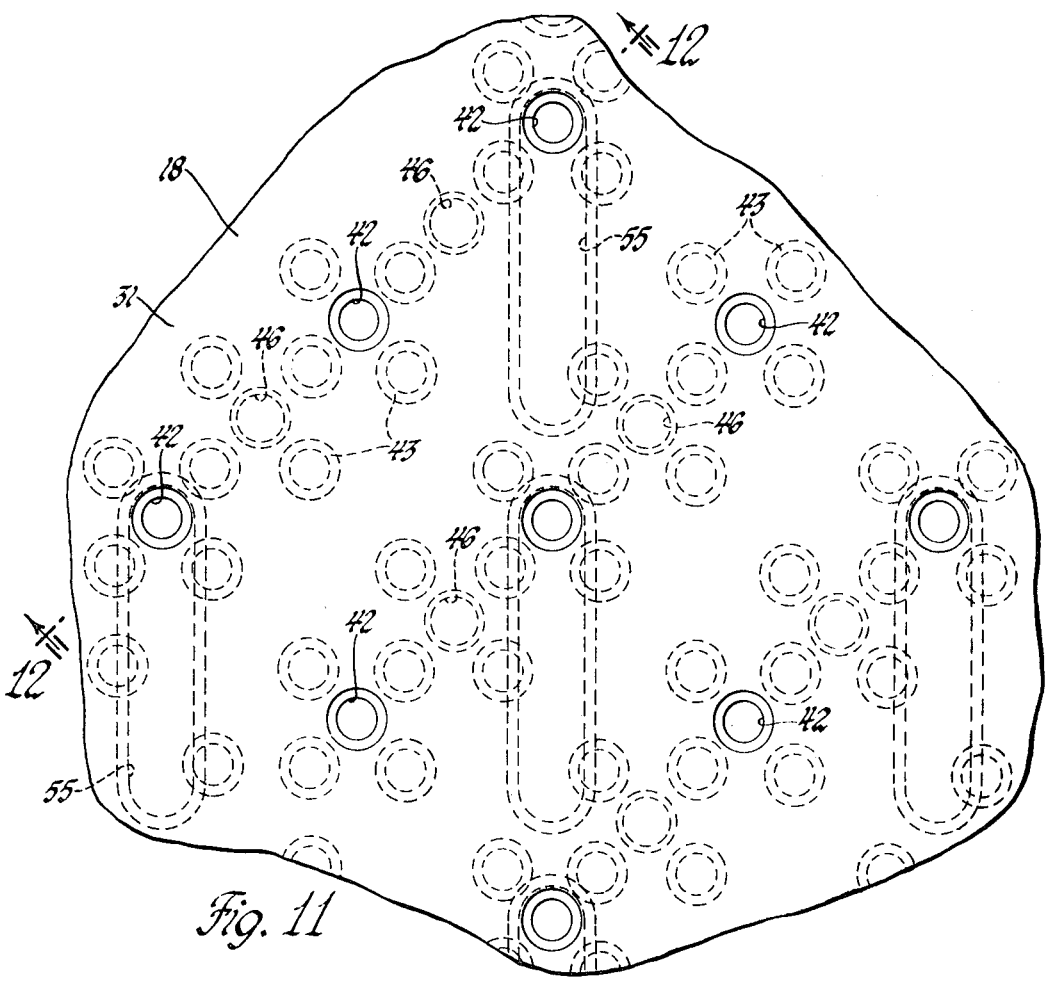
FIG. 11 is a fragmentary view of the outer face of the blade, illustrating the distribution of holes and bosses on the layers of the blade.
Figure 12:
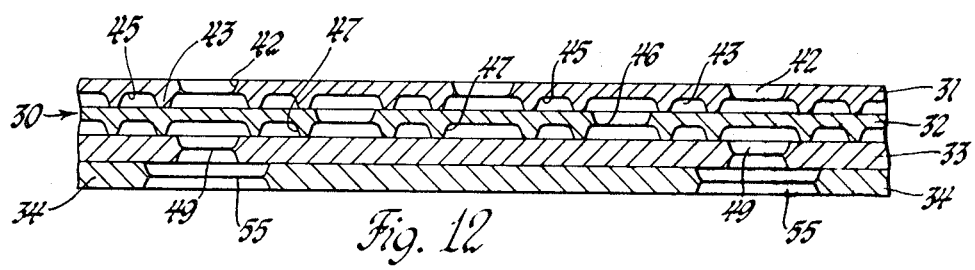
FIG. 12 is a sectional view of the blade wall taken on the plane indicated by the line 12—12 in FIG. 11.
Figure 13:
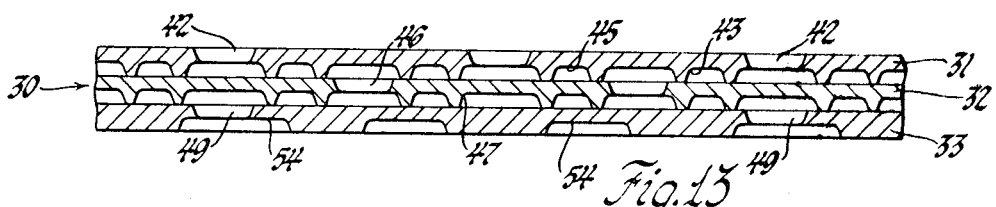
FIG. 13 is a sectional view of the blade wall taken on the plane indicated by the line 13—13 in FIG. 6.

Referring particularly to FIGS. 11 and 13, the outer layer 31 has holes 42 in the outer surface, which are preferably photoetched through the metal, and has small annular or ring-shaped bosses 43 extending from the inner face of the sheet. These bosses also are preferably formed by photoetching away the material of the sheet, leaving the bosses. The bosses are not necessarily of any particular shape, but it is preferred that they be annular, with a pit 45 in the interior of the boss. Similarly, the middle layer 32, is formed with distributed holes 46 and bosses 47 the holes 46 being out of register with the holes 42. The number and size of holes in the layers 31 and 32 and the hole spacing may be the same for both layers. In FIG. 11, the rectangular disposition of the holes 42 will be apparent. In the area illustrated, these are distributed in lines inclined approximately 45° to the spanwise and chordwise directions. FIG. 11 also illustrates in broken lines the holes 46 in the middle layer 32 and the location of bosses 43 on the inner surface of sheet 31. The bosses 47 are disposed in alignment with the bosses 43.

The inner layer 33 has an array of holes 49 which preferably are aligned with alternate ones of the holes 42 in the outer layer. In the preferred structure, the holes 49 are primarily responsible for metering the flow of cooling air. Thus, as will be clear from FIG. 13, the cooling air flows through the holes 49 in the inner layer, between the bosses 47 on the middle layer, through the holes 46 in the middle layer, around the bosses 43 on the outer layer, and is discharged through the holes 42 in the outer layer. The hole spacing varies as needed and need not be constant over the entire blade. Referring to FIG. 6, for example, it will be noted that in the area indicated as 50 near the leading edge, the holes or pores 42 are more closely spaced than in the area 51, and are still less closely spaced in an area 52 near the base of the blade adjacent the trailing edge. The holes in the middle and inner layers are likewise varied in spacing.

Referring to FIGS. 6, 9, 10, and 13, the portion of inner layer 33 near the tip of the blade is provided with a weight reducing structure by spanwise extending recesses 54 which are provided to lighten the blade wall and thereby reduce the centrifugal force exerted by the outer portion of the blade on the blade root. By having these recesses extend spanwise of the blade, a structure roughly equivalent to a ribbed structure is provided which has its major strength in the spanwise direction, where greatest strength is needed. Some, but not all, of the recesses 54 are in communication with the direction the holes 49 through the inner layer 33.

We may now consider the inner wall or reinforcing layer 34, with particular reference to FIGS. 6, 7, 8, 11, 12, and 14. The inner wall 34 is penetrated by a large number of oblong slots 55 which have their long axes extending spanwise of the blade and are distributed in rows extending spanwise and chordwise of the blade over substantially the entire area of the layer 34 except for the portion at the leading edge and the portion which extends into the base of the blade. These slots preferably are about four or five times as long as they are wide, as is most clearly apparent in FIG. 7. They may be formed by photoetching inward from each face of the sheet to create the through holes or slots 55. The slots 55 are distributed so as to provide access for the cooling air to the holes 49 in the inner layer of the outer wall. As will be clearly apparent from FIGS. 6 and 14, the number of rows of slots 55 increases toward the outer margin 41 of the sheet 34. Thus, for each row adjacent the base of the blade, there are two rows farther from the base and three rows adjacent the edge 41. Thus, the density and the tensile strength of the sheet in the spanwise direction is effectively tapered toward the outer edge. Not all of the slots 55 communicate with the holes 49, but those in the more widely spaced rows communicate with the holes 49. Shorter slots or holes 57 and 58 may be provided at the ends of the spanwise rows to conduct air to the holes 49 and to lighten the structure of the reinforcing layer. Thus, it will be seen that the greater concentration of the slots or holes in thjedirection toward the outer edge of sheet 34 effects a tapering of weight and strength of the sheet consonant with the diminishing centrifugal load toward the outer end of the blade; also, the recesses 54 toward the outer end of the inner layer 33 serve the same purpose. It is thus possible, with sheets of constant thickness, to achieve a desirable tapering of the weight and tensile strength of the blade structure from base to tip.

Of course, it is possible to use tapered sheets to an extent for the same purpose, and it is possible to combine the differential hole or recess provision shown in the drawings with a sheet which tapers in thickness toward the tip of the blade. Thus, either the outer or inner wall may be tapered by the use of tapered layers; however, the effective tapering is possible in the structure shown with layers of constant thickness, which have advantages from the standpoint of ease and economy of fabrication.

Figure 16:
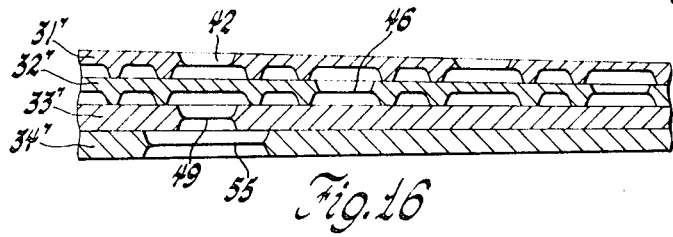
FIG. 16 is a sectional view similar to FIG. 12 but showing a laminated structure with sheets tapered in thickness.
Figure 14:
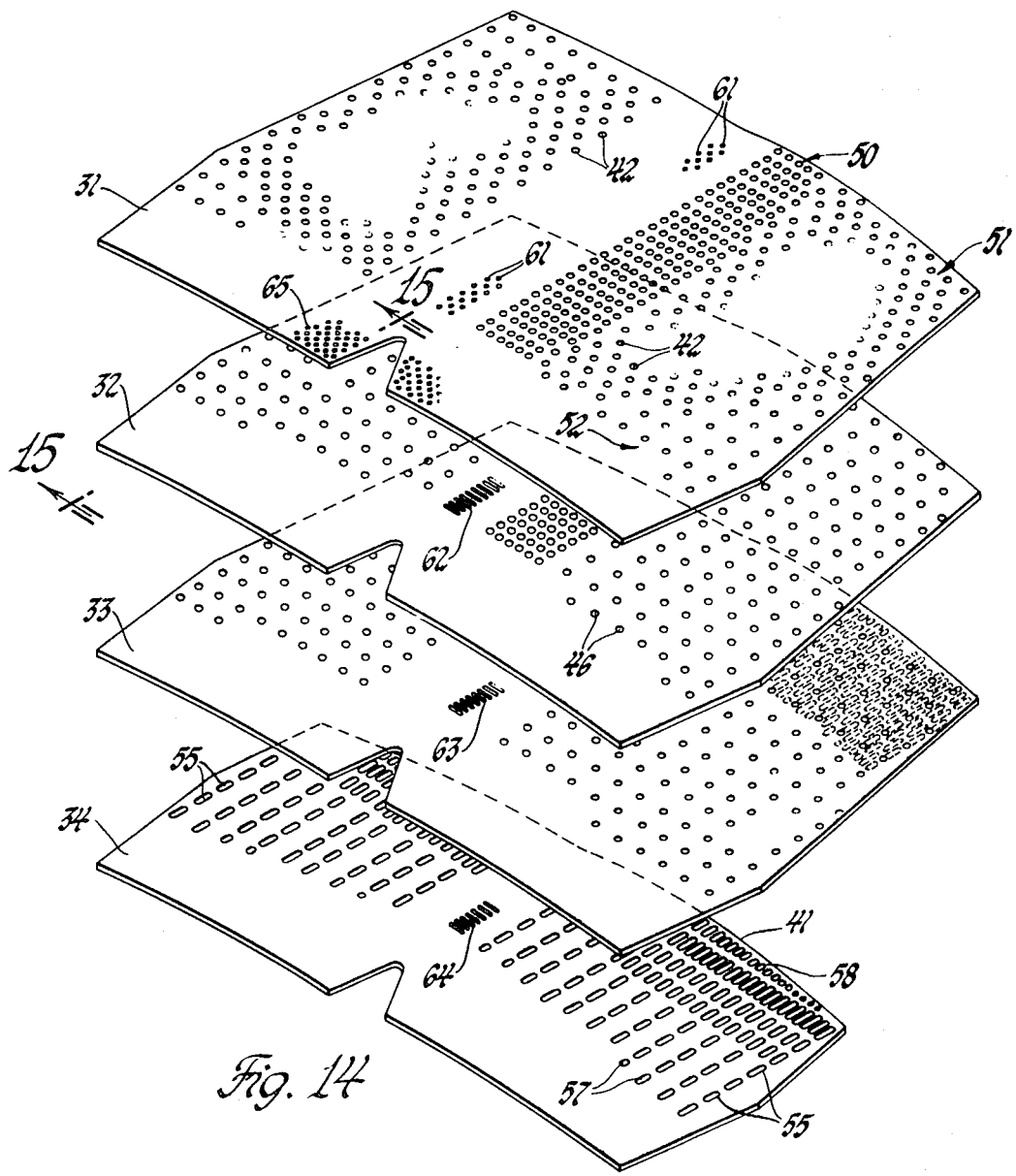
FIG. 14 is an exploded view illustrating the four layers or laminae which are bonded together and formed to constitute the blade.
Figure 15:
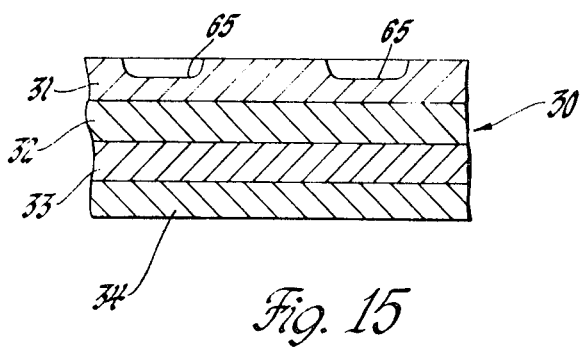
FIG. 15 is a fragmentary sectional view of the blade wall taken on the plane indicated by the line 15—15 in FIG. 14.

A structure with tapered laminae is shown in FIG. 16, in which the taper is somewhat exaggerated for clarity of illustration. Here the layers are identified as 31', 32', 33', and 34'. Note that the layers taper toward the tip of the blade, but that the depth of the passages in the inner faces of the sheets remains constant. The taper of the layers is effectively on the outer sides of the layers in this configuration, so that pores 42 and 46 are shorter, but the permeability characteristics are not altered. Of course, permeability varying toward the blade tip could be provided if desired. Any one or all of the sheets may be tapered in thickness before the photoetching or other treatment to provide the holes or slots and surface relief. This tapering is preferably used in connection with the varying concentration of slots and holes in the layers described in connection with FIGS. 6 through 15, but not necessarily so.

Mention may be made of the arrangement for film cooling of the leading edge of the blade, which is essentially the same as that described in the Helms application referred to above. The leading edge portion of the outer layer 31 is provided with a large number of small holes 61 through which cooling air is forced to flow from the leading edge and over the faces of the blade to provide a cooling film between the motive fluid and the blade wall. It is applied to these holes through holes or slots 62, 63, and 64 in the layers 32, 33, and 34, respectively, these slots being aligned when the sheets are registered for bonding so that there is a direct passage for the film cooling air to the leading edge of the blade.

The portion of the outer layer 31 which is disposed within the blade base is etched to provide a large number of small depressions or pits 65 (see also FIG. 15) which create a mechanical bond between the outer surface of the blade and the cast metal of the blade base. This structure is also present in the blade of the Helms application referred to above.

It should be apparent to those skilled in the art that structure in accordance with the principles of my invention is particularly adapted to provide a blade having a superior relation of weight and strength and embodying the effective cooling principles of the prior art blades described in the patent applications referred to above. It should also be apparent that the structure is very easy to fabricate, using the techniques of the prior art.

The detailed description of the preferred embodiments of the invention for the purpose of explaining the principles

I claim:

1. A fluid-directing element adapted to be incorporated into a turbomachine rotor and including a blade the spanwise direction of which is generally perpendicular to the axis of rotation of the rotor, the blade being a hollow structure of controlled porosity having a wall defined by the mutually bonded layers of metal having an array of holes extending through the layers for flow of a fluid through the blade wall, the holes in at least one of said layers being out of register with the holes in a contiguous layer, in which at least some of the holes are of oblong configuration with the long dimension of the holes extending generally spanwise of the blade so as to provide a high ratio of metal area to hole area in a chordwise cross section of the wall for a given ratio of hole area to total area in the plane of the layers.

2. A fluid-directing element as recited in claim 1 in combination with a turbine motor on which the element is mounted and a plurality of other fluid-directing elements as recited in claim 2 mounted on the rotor.

3. A fluid-directing element as recited in claim 1 in which at least one of said layers tapers in thickness toward the tip of the blade.

4. A turbine blade assembly comprising a base, a hollow porous blade fixed to and extending from the base, the blade having a wall tapering in thickness toward the tip of the blade, and a hollow porous reinforcing layer fixed to the base, lying against the interior surface of the blade, and fixed to the blade, so as to reinforce the attachment of the blade to the base, the reinforcing layer having porosity increasing in the direction away from the base.

5. A blade assembly as recited in claim 4 in which the hollow porous blade is defined by a laminated metal structure.

6. A blade assembly as recited in claim 4 in which the blade is defined by a wall having pores at predetermined points and the reinforcing layer has holes registering with holes in the blade wall.

7. A blade assembly as recited in claim 4 in which the reinforcing layer tapers in thickness toward the tip of the blade.

8. A turbine blade assembly comprising a base, a hollow porous blade fixed to and extending from the base, and a hollow porous reinforcing layer fixed to the base, lying against the interior surface of the blade, and fixed to the blade, so as to reinforce the attachment of the blade to the base, the reinforcing layer tapering in thickness toward the tip of the blade and having porosity increasing in the direction away from the base.

9. A blade assembly as recited in claim 4 in which the reinforcing layer has slots through it and the concentration of slots increases in the direction away from the base.

10. A blade assembly as recited in claim 9 in which the slots are oblong with their major axes extending generally spanwise of the blade.

11. A fluid-directing element for a turbomachine adapted for transpiration cooling comprising in combination, an attaching portion configured for mounting on a turbomachine rotor and a blade extending from the attaching portion; the blade including a porous outer wall adapted for flow of a cooling fluid from within the wall to the exterior of the blade; and including an inner wall lying against and bonded to the outer wall, both walls extending into the attaching portion and being fixed to the attaching portion; the innner wall serving as stress-carrying member to reinforce the outer wall against stresses generated in the blade by centrifugal and fluid-dynamic forces; one of said walls tapering in thickness toward the tip of the blade the inner wall having pores extending through to conduct cooling fluid from within the inner wall to the outer wall; the ratio of pore volume to metal volume increasing in the inner wall in the direction away from the attaching portion so that the density and tensile strength of the inner wall increases in the direction toward the attaching portion.

12. A fluid-directing element as recited in claim 11 in which both said walls taper in thickness toward the tip of the blade 13. An element as recited in claim 11 in which the outer wall has pores distributed in a predetermined pattern registering with pores in the inner wall and the pores in the inner wall are of greater area than those in the outer wall so that those in the outer wall control the effective porosity.

14. An element as recited in claim 11 in which the pores in the inner wall are oblong with the major axis directed substantially spanwise of the blade so as to provide a high ratio of metal area to pore area in a chordwise cross section of the wall for a given ratio of pore area to total area in the plane of the layers.

15. A fluid-directing element for a turbomachine adapted for transpiration cooling comprising, in combination, an attaching portion configured for mounting on a turbomachine rotor and a blade extending from the attaching portion; the blade including a porous outer wall made up of plural layers bonded together, the layers having pores through the layers defining passages through the wall adapted for flow of a cooling fluid from within the wall to the exterior of the blade; and including an inner wall lying against and bonded to the outer wall, both walls extending into the attaching portion and being fixed to the attaching portion, the inner wall serving as a stress-carrying member to reinforce the outer wall against stresses generated in the blade by centrifugal and fluid-dynamic forces; the inner wall having pores extending through it to conduct cooling fluid from within the inner wall to the pores in the outer wall; the pores in the outer wall registering with pores in the inner wall, the pores in the inner wall being of oblong configuration with the long dimensions of the pores extending generally spanwise of the blade so as to provide a high ratio of metal area to pore area in a chordwise cross section of the wall for a given ratio of pore area to total area in the plane of the layers; one of said walls tapering in thickness toward the tip of the blade.

16. A fluid-directing element as recited in claim 15 in which both said walls taper in thickness toward the tip of the blade.

* * * * *

PO-1050
(5/69)

UNITED STATES PATENT OFFICE
CERTIFICATE OF CORRECTION

Patent No. __3,619,082__          Dated __November 9, 1971__

Inventor(s) __George B. Meginnis__

It is certified that error appears in the above-identified patent and that said Letters Patent are hereby corrected as shown below:

Column 2, line 43, "which" should read -- where --.

Column 3, line 4, "then" should read -- them --; line 61, delete "direction the".

Column 5, line 10, delete "the"; line 23, "claim 2" should read -- claim 1 --; line 50, "claim 4" should read -- claim 8 --.

Column 6, line 8, before "stress" insert -- a --; line 12, after "through" insert -- it --.

Signed and sealed this 1st day of August 1972.

(SEAL)
Attest:

EDWARD M. FLETCHER, JR.
Attesting Officer

ROBERT GOTTSCHALK
Commissioner of Patents